(No Model.)  L. LUPPEN.  2 Sheets—Sheet 1.

SEED PLANTER.

No. 271,345.  Patented Jan. 30, 1883.

Witnesses.
A. Ruppert.
J. Barker

L. Luppen
Inventor.
Holloway & Blanchard
Attys (No Model.) 2 Sheets—Sheet 2.

L. LUPPEN.
SEED PLANTER.

No. 271,345. Patented Jan. 30, 1883.

Witnesses.
A. Ruppert.
J. Barker.

L. Luppen
Inventor.
Holloway & Blanchard
Att'ys

UNITED STATES PATENT OFFICE.

LUPPE LUPPEN, OF PEKIN, ILLINOIS.

SEED-PLANTER.

SPECIFICATION forming part of Letters Patent No. 271,345, dated January 30, 1883.

Application filed June 10, 1882. (No model.)

*To all whom it may concern:*

Be it known that I, LUPPE LUPPEN, a citizen of the United States of America, residing at Pekin, in the county of Tazewell and State of Illinois, have invented certain new and useful Improvements in Seed-Planters, of which the following is a specification, reference being had therein to the accompanying drawings.

My invention relates to improvements in seed-planters; and the objects of my improvements are, first, to provide novel mechanism for operating the seed-dropping device; second, to provide novel devices and combinations thereof for performing the functions hereinafter described. I attain these objects by the mechanism illustrated in the accompanying drawings, in which—

Figure 1:
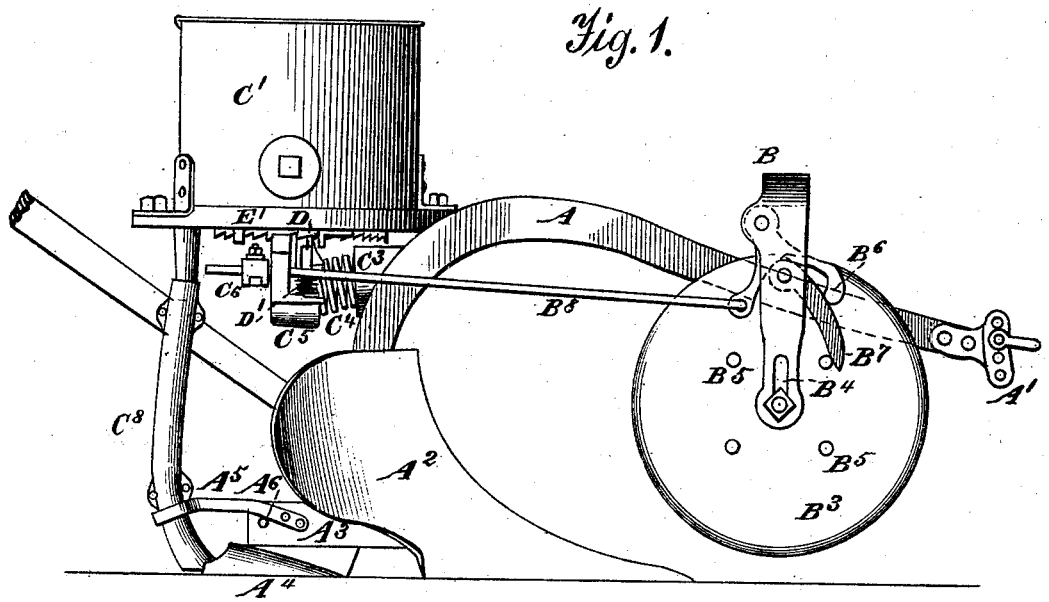
Figure 2:
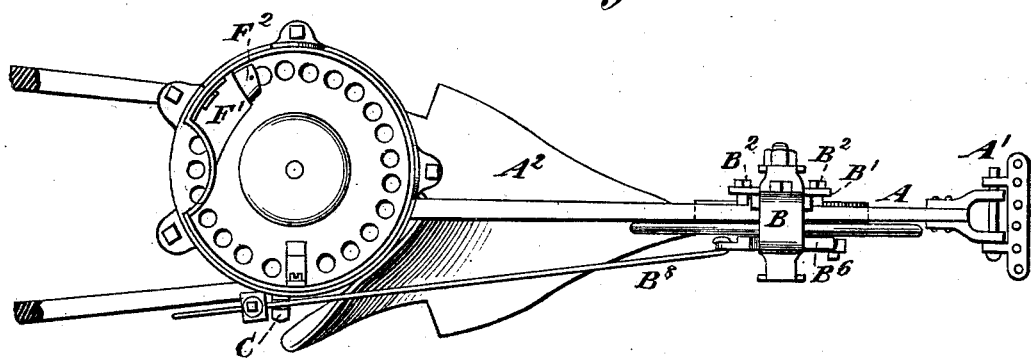
Figure 3:
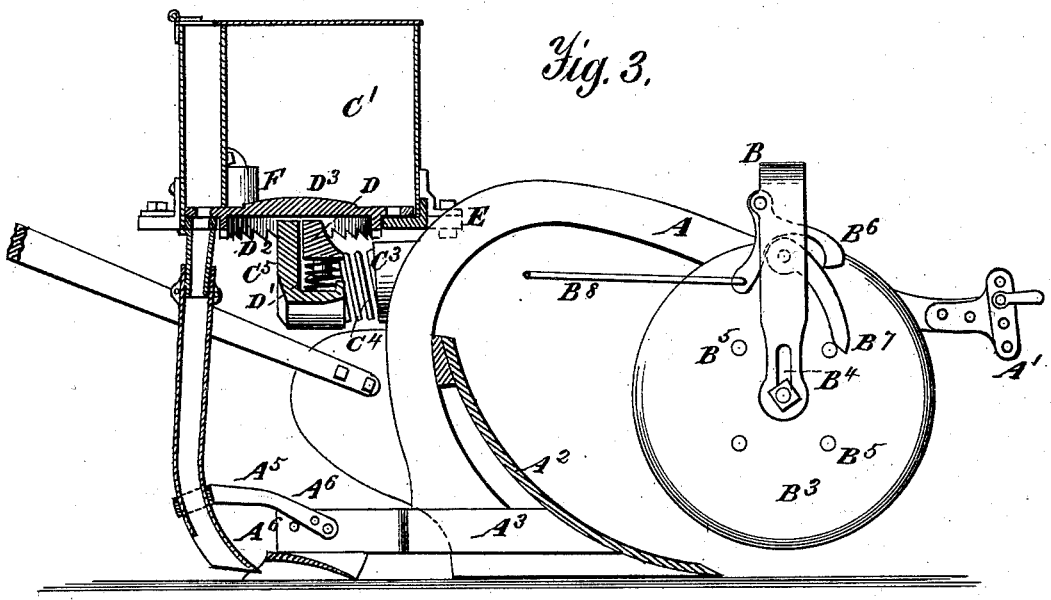
Figures 4, 5:
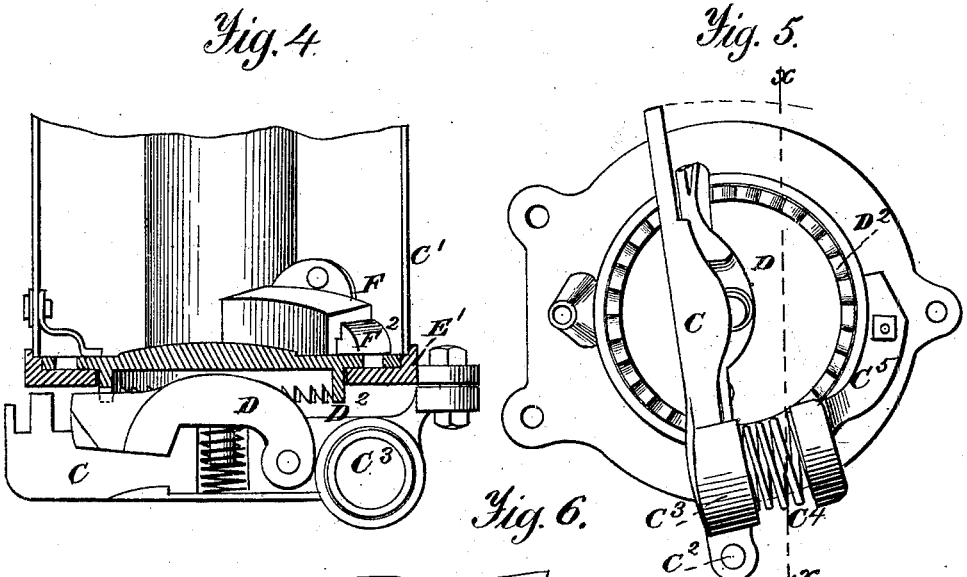
Figure 6:
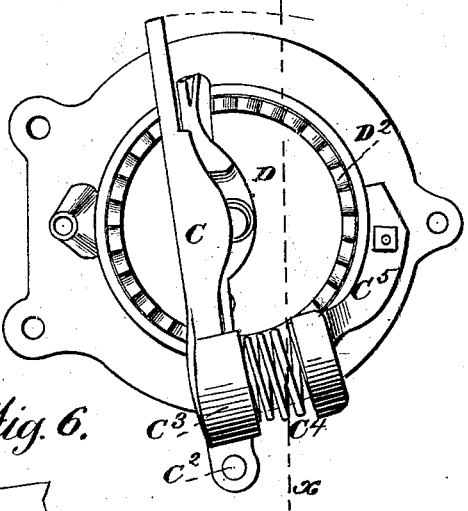

Figure 1 is an elevation of my improved implement, showing a guiding-wheel which operates the dropping mechanism, the parts constituting such mechanism, a plow-beam carrying a double furrow-opener, a subsoil furrow-opener and seed-coverer, a reservoir for the corn or other seeds to be planted, and an adjustable tube for conducting said seeds to the furrows opened by the subsoil-plow, and handles for guiding the implement. Fig. 2 is a plan or top view, showing the seed-reservoir, a revolving disk placed therein, having formed in it seed-cells for containing the number of seeds for each hill, and a scraper for preventing more than the required number of seeds from passing to the conducting-tube. Fig. 3 is an elevation, partly in section, showing the parts enumerated in the description of Fig. 1, and in addition the frame of the seed-receptacle and the ratchet upon the under side of the revolving disk in which the seed-cells are formed. Fig. 4 is a sectional elevation on line $x$ $x$ of Fig. 5, showing the seed-receptacle, the seed-guard therein, the revolving seed-disk, the lever which moves it, and the springs connected with said lever. Fig. 5 is an under side view of the seed-receptacle, showing the ratchet-teeth on the revolving disk, the lever which operates the same, and a spring for returning it to its proper position after it has been moved by the pins placed in the guiding-wheel; and Fig. 6 is a detached sectional view, showing a portion of the revolving disk, the seed-guard, and a spring for keeping the same in position.

Similar letters refer to similar parts throughout the several views.

In constructing an implement with my improvements attached for planting corn and other seeds in hills I provide any suitable form of beam A, which may be provided with any suitable form of clevis for connecting the whiffletree thereto. The beam is by preference curved, as shown, and carries upon its lower inner portion a double mold-board, $A^2$, which is designed to turn a furrow in both directions as it is moved forward, the point or shoe of said mold-board being double and constituting a part of said mold-board; or it may be separated therefrom and bolted to it in the usual or any approved manner.

To the inner surface of the mold-board $A^2$, at or near its center, there is secured a bar of metal, $A^3$, which extends rearward therefrom sufficiently far to admit of there being secured upon its outer end a subsoil-plow, $A^4$, its office being to open a furrow or groove in the bottom of the one formed by the large plow or mold-board $A^2$, and at the same time loosen and pulverize the earth to such an extent as to cause it to receive the seeds and fall upon and cover them as the implement passes along. This bar is secured to the mold-board by bolts or rivets at its forward end, and carries upon its outer end an adjustable guide, $A^5$, it being provided with a series of holes, in order that it may be adjusted so as to cause the seed-conducting tube to be near to or farther from the rear end of the subsoil-plow, and said tube may also be adjusted vertically by providing a series of holes in the bar $A^3$ for the reception of the pin $A^6$, upon which the guide $A^5$ rests, as shown in Figs. 1 and 3.

As a means of operating the dropping mechanism soon to be described, and for the purpose of forming a guide for the mold-board $A^2$, there is attached to the beam A at the proper point a yoke, B, which is made vertically adjustable on said beam by a strap, $B'$, it being held in its fixed position by bolts $B^2$, which pass through said beam and strap, and are provided with threads for holding the parts in their adjusted position. As a consequence of this arrangement of parts the yoke can be moved up or down, so as to allow the wheel $B^3$, which it carries, to enter the earth to any required depth, or to run on the surface thereof, according to the circumstances under which the implement is used. For the purpose of providing for the automatic rising and falling of the wheel, in addition to the vertical adjustment above described, the yoke is provided at its lower ends with slots $B^4$, in order that in the event of the wheel meeting with any obstruction—such as a stick or stone—it may rise up and pass it and automatically fall back to its proper position without having affected the depth of the furrow formed by the plows.

The wheel $B^3$, above alluded to, may have a sharpened outer edge to enable it to cut any cornstalks or grass that may lie in its path; or it may have a beveled rounded periphery, thus causing it to act only as a guide-wheel. I prefer, however, to make it in two parts—a central portion and a ring to fit thereon—so that said ring, if sharp on its outer edge, may be removed and replaced by another having a broader surface. In either case it is to be provided with a series of pins or projections, $B^5$ $B^5$, of which there may be any desired number, their office being to operate the seed-dropping mechanism, which consists of a sector-shaped arm or lever, $B^6$, which is pivoted to the yoke B at a point sufficiently high above the plow-beam to allow the pins which move it to pass under it when the wheel is raised up or is passing over any obstruction, said wheel being placed upon an axle which passes through the two arms of the yoke, the outer ends of which are provided with nuts to prevent said arms from spreading apart.

To the arm $B^6$ there is pivoted a swinging dog or arm, $B^7$, the length of which is sufficient to allow it to be acted upon by the pins or projections $B^5$ as they pass it, and thus carry said dog or arm over the sector-shaped lever into the position in Figs. 1 and 3, the effect being to cause the rod $B^8$ to carry forward the free end of a lever, C, the opposite end of which is pivoted to the bottom plates of the seed-receptacle C', or to an arm formed thereon, as shown at $C^2$ in Fig. 5. Near the pivoted end of this lever there is formed a socket, $C^3$, in which there is placed a spiral spring, $C^4$, the opposite end of which rests in a socketed bracket, $C^5$, which is bolted to the lower plate of the seed-receptacle. The rod $B^8$ being adjustably connected to the free arm of the lever C by means of a clamp, $C^6$, the position of the seed-cells in the revolving disk $C^7$ may be adjusted with reference to the conducting pipe or tube $C^8$, which delivers the seeds at a point just in rear of the subsoil-plow, said tube being adjustable vertically and horizontally, as above described. The office of the coiled spring $C^4$ is to return the rod $B^8$ and the lever C to their normal positions after the pins or projections in the wheel $B^3$ have carried them forward for the purpose of bringing one or more of the seed-cells over the conducting-tube.

Upon the lever C, at a point between its fixed and free end, there is pivoted a dog or latch, D, it being provided at or near its center with a pin, around which there is a spiral spring, D', the opposite end of which rests upon the projection formed on the lever C. The office of said dog or latch and spring, and of causing them to be carried on the lever C, is to permit said dog or latch to engage with the ratchet-teeth upon the under surface of the revolving disk, soon to be described, as the free end of the lever C is carried forward.

The seed-receptacle heretofore alluded to consists of a vessel or cup, C', which is attached to the plow-beam by a single bracket, E, for the purpose of rendering it readily removable in shipping the implement, said vessel being of any desired dimensions and provided with a cover of the usual form, its lower surface consisting of a plate of metal with an upwardly-extending flange, E', while at its center there is an opening into which the projecting portion $D^2$ of the revolving disk enters, said portion being provided upon its lower edge with ratchet-teeth, as shown in Fig. 3. The upper portion of the disk is of sufficient diameter to cause it to cover the bottom of vessel or cup C', and is provided with a row of seed-cells, as shown in Figs. 2 and 3, which are of sufficient capacity to hold just the number of seeds or kernels which it is desirable to drop in one hill; or they may be of one-half or less of such capacity, and a sufficient amount of movement may be imparted to the disk to bring two or more of them over the conducting-tube at one time; or the disk having in it a certain size of cells may be removed and replaced by another having greater or less capacity of cells. I prefer to make the vertical portion of the seed-receptacle of the form shown in Figs. 2 and 3, in order that the seed-cells may be exposed to view at the point where they deliver the seeds to the conducting-tube, so that the operator can always see at a glance whether or not the seed is properly delivered, and so that he can at any time pass a rod or stick down through said tube, and thus clear it out should the seeds become clogged therein or its lower end be stopped up with dirt.

In case the operator pulls the plow backward in turning, or in case of removing any obstruction, the dropper is not affected.

For the purpose of preventing more than the required number of seeds or kernels from being carried to the conducting-tube by any one cell, there are placed in the vessel or cup C' scrapers or seed-controllers F, which consist of an abutment, F', into which there is placed a plate of metal, $F^2$, one end of which projects through the wall of the abutment, and is beveled, as shown in Figs. 3 and 6, so that as the cells come in contact therewith all the seeds or kernels that are not below or even with the upper surface thereof are prevented from passing it, it being held down upon the surface of the disk by a spring, $F^3$, by which means the breaking of the seed is prevented.

Having thus described my invention, what I claim, and desire to secure by Letters Patent, is—

1. In an implement for planting corn and other seeds, the combination of the beam thereof, a wheel carrying pins or projections for operating the dropping mechanism, a yoke attached to said beam and carrying a sector-shaped arm or lever and a dog for engaging with the pins on or in the wheel, a connecting-rod, and a lever carrying a dog or latch for operating the disk containing the seed-cells, said lever being moved in one direction by the force applied to give a forward movement to the implement and in the other direction automatically by the force of a spring, substantially as and for the purpose set forth.

2. The combination, in a seed-planter, of a subsoil-plow carried upon a plate of metal attached at one end to the mold-board of the main plow and extending rearwardly in a line with the base of the main plow, an adjustable seed-tube attached to the handle of the main plow, said tube conducting the seeds to an aperture formed in the rear portion of the subsoil-plow, and a moving seed-cell plate, as described, for depositing the seeds in the tube, substantially as set forth.

3. In a seed-planter, the combination of a seed-receptacle, $C'$, a portion of the outer surface of which is within the circle of seed-cells, the seed-controlling mechanism $F$ $F'$ $F^2$, the revolving disk $D^3$, the operating-lever $C$, spring $C^4$, rod $B^8$, yoke $B^6$, pawl $B^7$, and wheel $B^3$, the parts being arranged for joint operation substantially as set forth.

4. The combination of the lever $C$, spring $C^4$, socket $C^5$, latch or dog $D$, its operating-spring $D'$, and the rotating disk $D^3$, substantially as set forth.

5. The combination of the beam $A$, the yoke $B$, sector-shaped arm or lever $B^6$, arm $B^7$, wheel $B^8$, and suitable mechanism for communicating the movement of the arm to the mechanism which controls the dropping of the seeds, substantially as set forth.

In testimony whereof I affix my signature in presence of two witnesses.

LUPPE LUPPEN.

Witnesses:
  H. F. FROEBE,
  W. HEMMINGHORN.